United States Patent
Nelson et al.

(10) Patent No.: US 7,148,691 B2
(45) Date of Patent: Dec. 12, 2006

(54) STEP CURRENT INDUCTIVE ANTENNA FOR PULSE INDUCTIVE METAL DETECTOR

(75) Inventors: Carl V. Nelson, Derwood, MD (US); Charles B. Cooperman, Highland, MD (US)

(73) Assignee: The Johns Hopkins University, Baltimore, MD (US)

( * ) Notice: Subject to any disclaimer, the term of this patent is extended or adjusted under 35 U.S.C. 154(b) by 58 days.

(21) Appl. No.: 10/942,160

(22) Filed: Sep. 16, 2004

(65) Prior Publication Data

US 2005/0104594 A1    May 19, 2005

Related U.S. Application Data

(60) Provisional application No. 60/505,186, filed on Sep. 23, 2003.

(51) Int. Cl.
*G01V 3/08* (2006.01)
*G01V 3/11* (2006.01)

(52) U.S. Cl. ...................... 324/326; 324/329

(58) Field of Classification Search ........... 324/326, 324/329
See application file for complete search history.

(56) References Cited

U.S. PATENT DOCUMENTS

| 5,576,624 A | 11/1996 | Candy |
| 6,653,838 B1 | 11/2003 | Candy |
| 6,686,742 B1 | 2/2004 | Candy |

*Primary Examiner*—Bot LeDynh
(74) *Attorney, Agent, or Firm*—Albert J. Fasulo, II

(57) ABSTRACT

A device and method to improve pulse inductive metal detector (MD) sensitivity uses multiple, current steps to reduce the voltage rating of electronic components. Current reduction in one implementation is done with multiple switched resistors coupled to a voltage source and connected to the transmitter coil. The current reduction in another implementation is done with multiple switched current sources that are connected to the transmitter coil and are switched inactive one by one to reduce the total current to the transmitter coil. The current is stepped down in rapid secession with a time delay between current transitions less than the time constant of the metal target under investigation.

9 Claims, 8 Drawing Sheets

STEP CURRENT INDUCTIVE ANTENNA FOR PULSE INDUCTIVE METAL DETECTOR

CROSS-REFERENCE TO RELATED APPLICATIONS

This application claims the benefit of U.S. provisional application No. 60/505,186, filed on Sep. 23, 2003, which is incorporated herein by reference in its entirety.

STATEMENT OF GOVERNMENTAL INTEREST

This invention was made with U.S. Government support under Army contract no. DAAB-15-00-C-1008 and under Navy contract no. N00024-98-D-8124. The U.S. Government has certain rights in this invention.

BACKGROUND

FIG. 1 is a block diagram of a conventional pulsed EMI metal detector and method of operation. A current loop transmitter 10 is placed in the vicinity of the buried metal target 12, and a steady current flows in the transmitter 10 for a sufficiently long time to allow turn-on transients in the soil (soil eddy currents) to dissipate. The transmitter loop current is then turned off. The transmitter current is typically a pulsed waveform with a triangular-ramp or square-wave shape with positive and/or negative current flow.

According to Faraday's Law, the collapsing magnetic field induces an electromotive force (EMF) in nearby conductors, such as the metal target 12. This EMF induces eddy currents to flow in the conductor. Because there is no energy to sustain the eddy currents, they begin to decrease with a characteristic decay time that depends on the size, shape, and electrical and magnetic properties of the conductor. The decay currents generate a secondary magnetic field that is detected by a magnetic field receiver 14 located above the ground and coupled to the transmitter 10 via a data acquisition and control system 16.

Pulse induction metal detector (PIMD) antennas (transmitter and receiver coil) come in two basic types as shown in FIGS. 2a and 2b. The first type of PIMD uses a single transmit and receiver coil 22 with multiple loops of wire forming the coil (FIG. 2a). A current pulse is sent through the multiple turn coil 22 and the received metal detection signal is sensed by the same coil 22. The small voltage generated by the metal target is typically amplified by a high gain electronic amplifier 25 (typical gain factor of 100 to 1000). A protection circuit is provided to protect the sensitive amplifier from the high kick-back voltage pulse generated by switching the inductive coil off abruptly (V=L di/dt, where L is the inductance of the transmitter coil and di/dt is the slope of the current decay in the coil).

The second type of PIMD uses a separate transmitter coil 23 and receiver coil 24, again, with multiple loops of wire forming the coils (FIG. 2b). This configuration provides isolation between the transmitter circuit and the receiver circuit and allows for more flexibility in the receiver coil 24 (e.g., different number of turns, size or differential coil configuration) and amplifier circuit design (e.g., single ended operation of electronics). The high gain amplifier 25 also sees the high kick-back voltage pulse generated by switching the transmitter coil 23 off abruptly and protection circuitry is needed to protect it from damage.

The induced eddy currents in a metal target are proportional to the change in magnetic field with time ($\Delta B/\Delta t$) at the metal target location. For high sensitivity, one would like to have $\Delta B$ (the change in magnetic field) as large as possible and $\Delta t$ (the change in time) matched to the metal object's time response. For a small metal object with a fast time response the optimal detector sensitivity would be achieved with a small $\Delta t$ matched to the small metal objects response. For a large metal object with a slower time response the optimal detector sensitivity would be achieved with a larger $\Delta t$ matched to the metal object's time response. The magnetic field (B) is proportional to the current (I) in the transmitter coil and the number of coil turns (N), thus B~IN. More coil turns (N) increases the magnetic field at the target depth for a fixed current. However, increasing the number of coil turns also increases the kick-back voltage across the transmitter coil and switch due to the increased inductance. The voltage across the transmitter coil and the electronic switch turning off the coil current is $V=L\,\Delta I/\Delta t$ and $L\sim N^2$.

The desired sensitivity of the metal detector for a small metal object, which needs a small $\Delta t$, needs to be balanced with the kick-back voltage at the coil, the available electronic switch voltage rating and wire insulation rating. This is typically done by limiting the coil inductance which lowers the metal detector's sensitivity due to fewer coil turns or smaller coil size and/or increasing the turn-off time.

Several issues arise when attempting to increase a pulse inductive metal detector's sensitivity to small and large metal objects via increasing the $\Delta B/\Delta t$ of the metal detector (i.e., kick-back voltage across the coil). The high voltage electronic components required for the task are expensive, prone to failure and difficult to package. Moreover, the supporting mechanical structure for the coil and components must withstand the high voltage and thus may be expensive or dangerous in some situations (e.g., underwater or explosive gas environments). In addition, high voltage spikes may violate electromagnetic interference emission standards. Lastly, the protection circuit for the receiver electronics must be designed to handle the increased kick-back voltage.

Prior art metal detectors do not address these issues. Instead, prior art pulse inductive metal detectors avoid using high $\Delta B/\Delta t$ dB/dt configurations in their electronics to improve metal detection sensitivity.

SUMMARY

The present invention is a pulsed inductive metal detector transmitter coil system that is capable of increased sensitivity to metal targets without having to increase the magnitude of the transmitter charging current. The transmitter coil is charged with a current of a pre-determined magnitude. This current is gradually stepped down to zero over a pre-determined time interval as opposed to being abruptly turned-off. The time interval used is based on eddy current decay characteristics of a metal target, specifically, the time constant that defines how long it takes the eddy currents in the metal target to decay when excited by a pulse of current resulting from a reduction of current in the transmitter coil. The time interval is chosen to be less than the metal target time constant to ensure that the eddy currents from the previous step down have not decayed significantly. Each time the current to the transmitter coil is stepped down the eddy currents in the metal target increase. The increase in eddy currents in the metal target make it easier for the metal detector's receiver coil to detect and classify the metal target.

In one embodiment a voltage source coupled in series with one or more electronically switched resistors are used to excite the transmitter coil with a current. Each time a resistor is switched activated, the amount of current that excites the transmitter coil is stepped down. This causes the eddy currents in the metal target to increase. The number of step downs and the time interval can be varied to achieve a desired sensitivity for a given metal target.

In another embodiment a voltage source coupled with one or more electronically switched parallel resistors are used to excite the transmitter coil with a current. Again, each time a resistor is switched activated, the amount of current that excites the transmitter coil is stepped down. This causes the eddy currents in the metal target to increase. The number of step downs and the time interval can be varied to achieve a desired sensitivity for a given metal target.

In still another embodiment the transmitter coil is initially excited by a plurality of switched current sources. The amount of current exciting the transmitter coil is initially equal to the sum of each current source. One by one, the current sources are switched inactivated reducing the total current to the transmitter coil causing the eddy currents in the metal target to increase.

If there is some a priori knowledge of the metal target then the metal detector can be configured for maximum sensitivity by varying the length of the time interval between current step downs.

DETAILED DESCRIPTION

Figure 1:
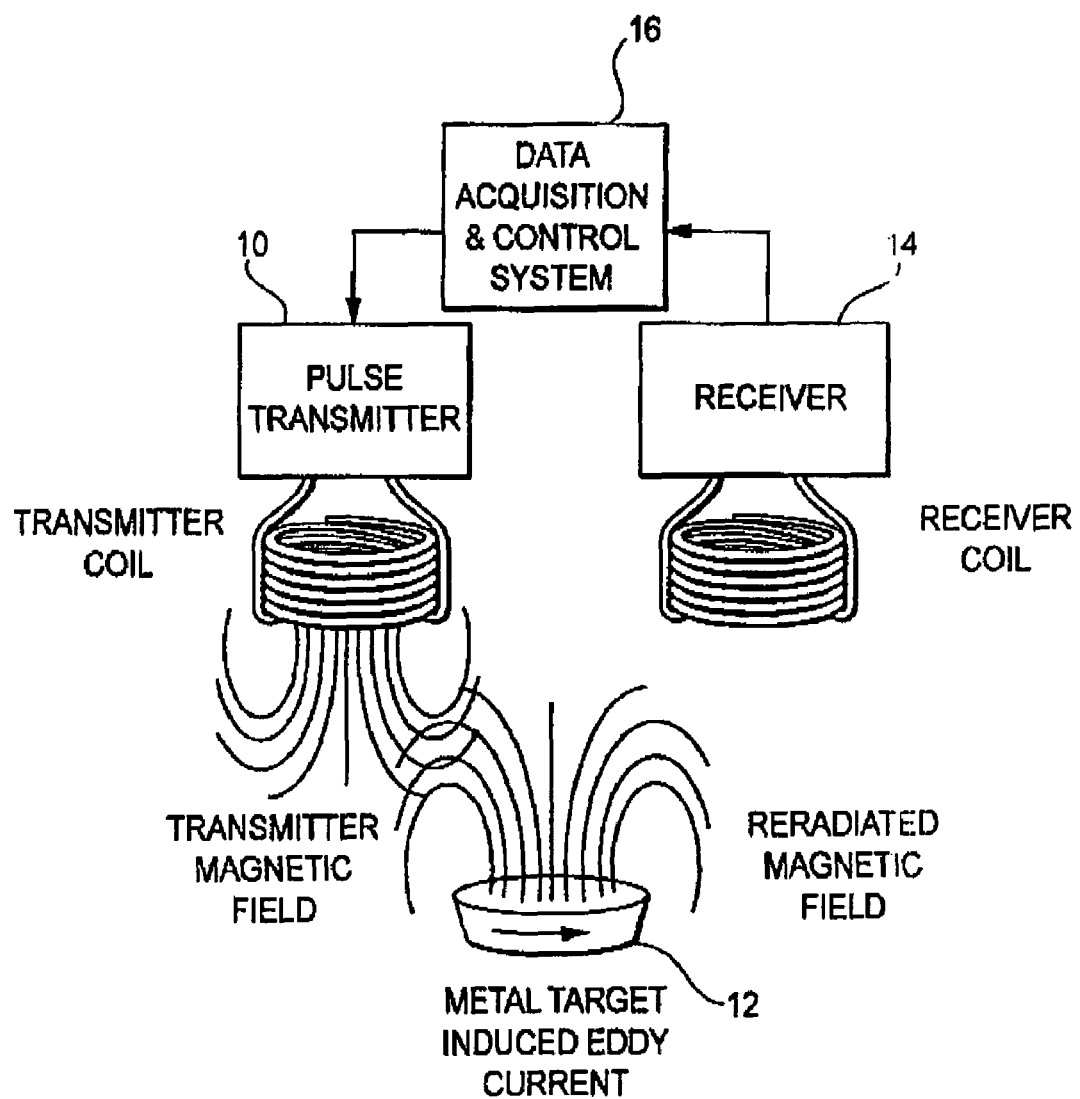
FIG. 1 illustrates a block diagram of a conventional pulsed EMI metal detector and method of operation.
Figure 2A:
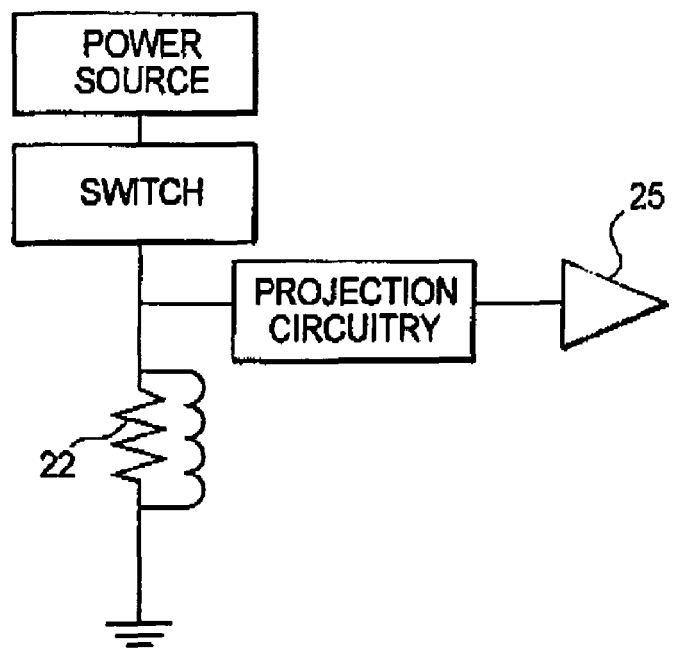
FIG. 2a illustrates a PIMD having a single transmit and receiver coil with multiple loops of wire forming the coil.
Figure 2B:
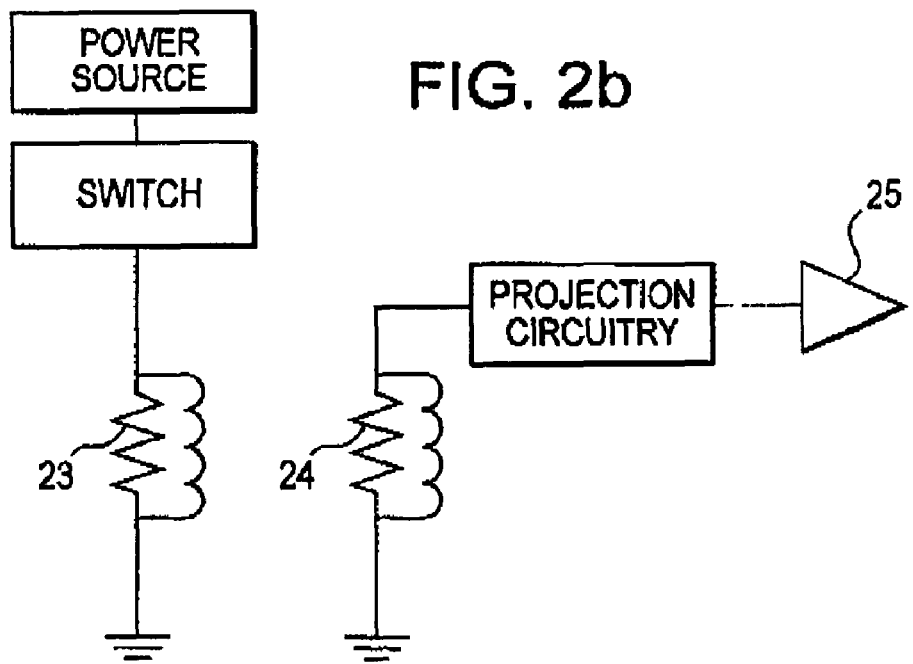
FIG. 2b illustrates a PIMD having a separate transmit and receiver coils with multiple loops of wire forming each coil.
Figure 3:
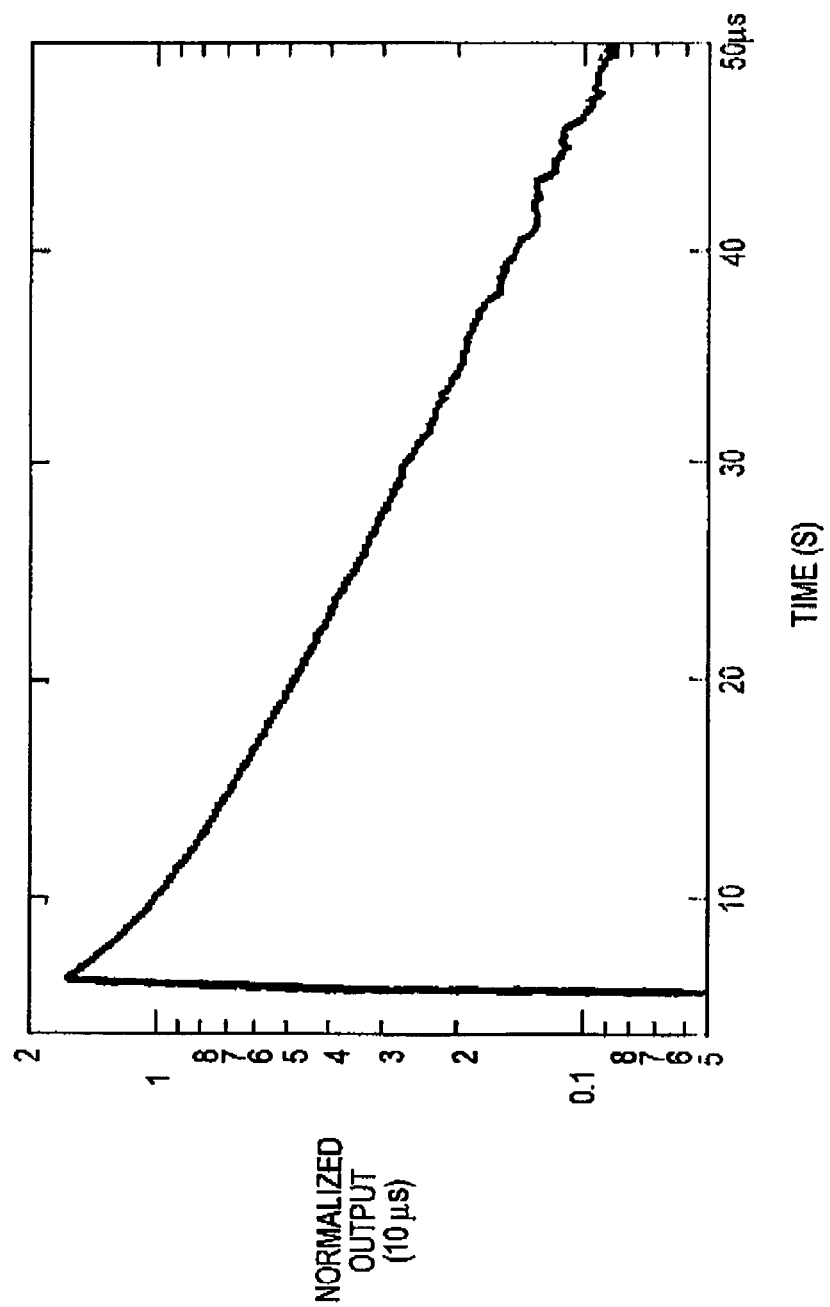
FIG. 3 is a graph of an eddy current time decay response of a small metal object.

The present invention takes advantage of the physics of the metal target eddy current time decay characteristics to improve pulsed metal detection sensitivity. FIG. 3 illustrates the eddy current time decay of a small metal object characteristic of a low-metal content mine. The metal target has a decay time constant of about 15 µs. The eddy currents in the metal target were caused by a transmitter coil excited by a single 5 A current pulse with a turn-off time of 0.5 µs. The high voltage requirements on the transmitter switch are minimal at these transmitter parameters (a few hundred volts). The output shown in FIG. 3 has been normalized to 1 at 10 µs to more clearly show the log-linear decay character of the metal target signature. The region before about 5 µs is where the amplifier is in saturation and the protection circuitry (FIGS. 2a–b) is functioning.

If the metal target is excited with a second 5 A current pulse, with the same turn-off time a few microseconds after the first pulse, the eddy currents in the target will not have had time to decay very much and an approximate doubling of the eddy currents would occur in the metal target. The doubling of eddy currents in the metal target would manifest themselves in a doubling of the output of the receiver coil. The increased receiver signal would improve the detection and classification potential (via signal processing of time decay signal) of the metal target. The original eddy currents would only have decayed a small amount since the pulse time interval (5 µs) is less than the time decay constant of the metal target (15 µs).

An approximate equation for the eddy currents, $I_{eddy}$, generated in the metal target is expressed as:

$$I_{eddy} \sim K_0 \exp(-t/\tau) + K_1 \exp(-(t+t_1)/\tau)$$

where t is time, $K_0$ and $K_1$ are the excitation parameters related to the transmitter area, coil current, turn off time and number of coil turns, $t_1$ is the delay time of the second excitation pulse, and τ is the decay time constant of the metal target. For a symmetric excitation pulse sequence of two pulses and $t_1$ small compared to τ, the eddy currents in the metal target are about twice the eddy currents from a single excitation pulse without the need for a higher current nor faster turn-off time in the transmitter coil. The output from a receiver designed to sense the decaying target eddy currents would be about twice that of a single pulse transmitter.

Figure 4A:
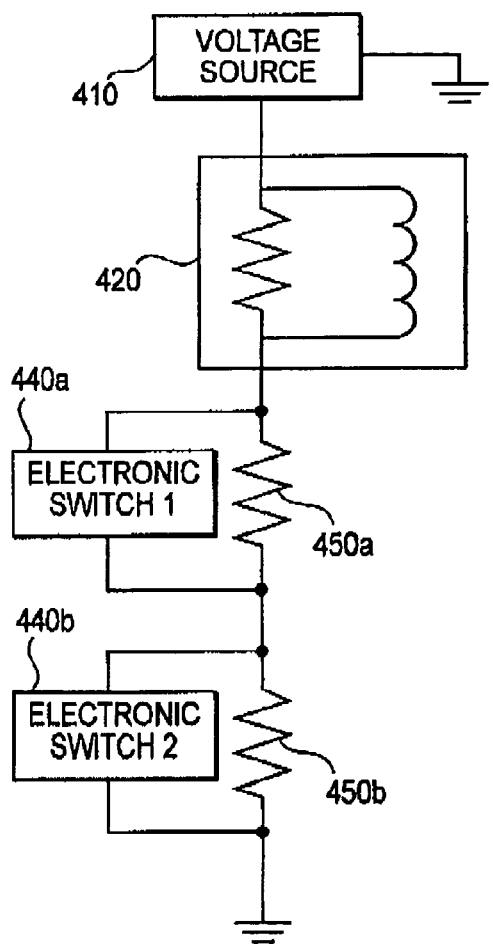
FIGS. 4a–b are block diagrams of the present invention using voltage sources to excite the transmitter coil.
Figure 4B:
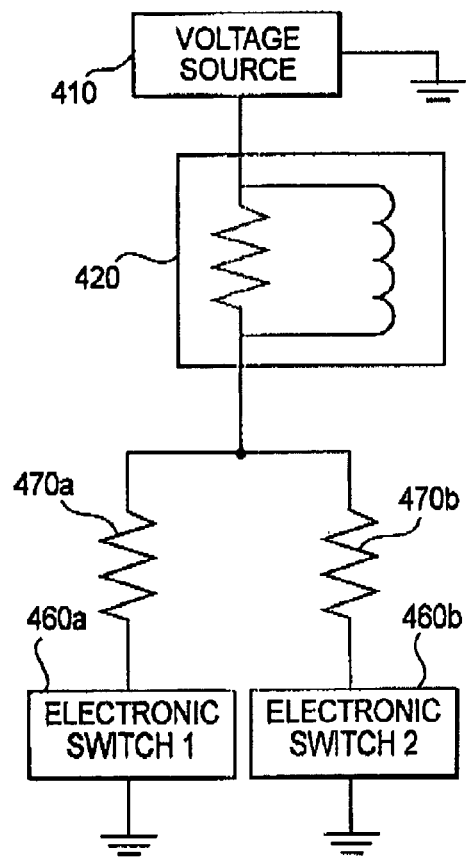

FIGS. 4a–b are block diagrams of the present invention that use voltage sources 410 to excite the transmitter coil 420. FIG. 4a uses a series combination of switches 440a, 440b and current limiting resistors 450a, 450b along with a voltage source 410. FIG. 4b uses a parallel combination of switches 460a, 460b and current limiting resistors 470a, 470b along with the voltage source 410. Electronic switches 440 and 460 form an electrical short-circuit when closed, and an electrical open-circuit when open.

Figure 5:
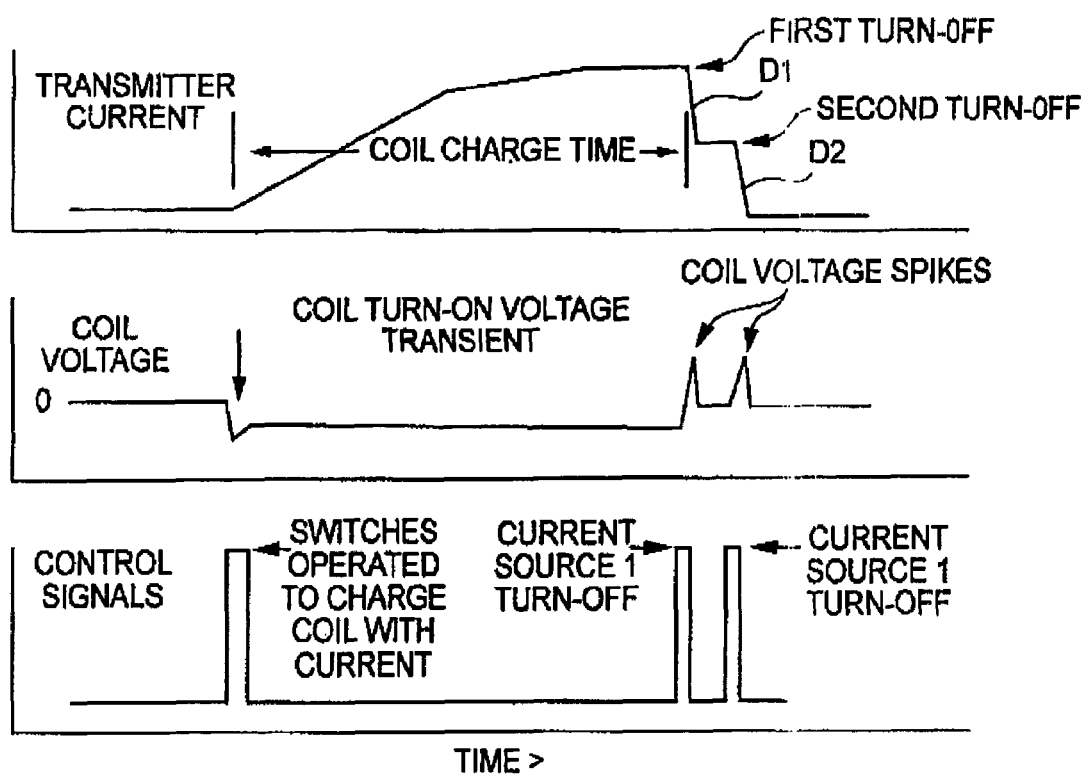
FIG. 5 is a timing diagram for one of the voltage source driven embodiments.

To better understand the operation of the present invention, consider FIG. 4a and the simplified timing diagram of FIG. 5. With both switches 440a, 440b closed, a maximum or peak current flows through the transmitter coil 420 and the short-circuited switches for a fixed length of time (see, coil charge time in FIG. 5 top trace). The first switch 440a is then opened, deceasing the current (see D1 in FIG. 5) in the transmitter coil 420 due to the addition of the series resistance 450a into the current path. The sharp change in current induces eddy currents in the metal target. After a small length of time, the second switch 440b is opened, further reducing the current (see D2 in FIG. 5) in the coil with the addition of a second current limiting resistor 450b in the current path. A second metal target excitation pulse is created. FIG. 4b works in a similar fashion but the switches 460a, 460b connect the current limiting resistors 470a, 470b in parallel instead of series. In FIG. 4b, both switches 460a, 460b are initially closed, and then sequentially opened to sequentially reduce the peak current in steps. FIG. 5 shows a "positive" voltage spike when the current is turned off. In reality, the voltage spike, by Faraday's Law, is negative. The resistors in FIG. 4 are referred to as electronically switched resistors that are considered activated when added in series with their respective excitation voltage sources. That is, each time a resistor is switched active (by opening the corresponding parallel switch), it is added in series with the excitation voltage source and thus becomes part of the current path feeding the transmit coil. Otherwise, when the resister is switched inactive (by closing the corresponding bypass switch), it is no longer part of the current path.

When the transmitter coil is charging with current there is a "negative" excitation voltage induced in the second trace of FIG. 5. This voltage would excite "negative" eddy currents in the target compared to the turn-off induced voltages. The arrangement of a single charge cycle that has multiple turn-off times removes the "negative" eddy currents that would happen if we just used many closely spaced triangular excitation pulses to "spin up" the target eddy currents.

Figure 6A:
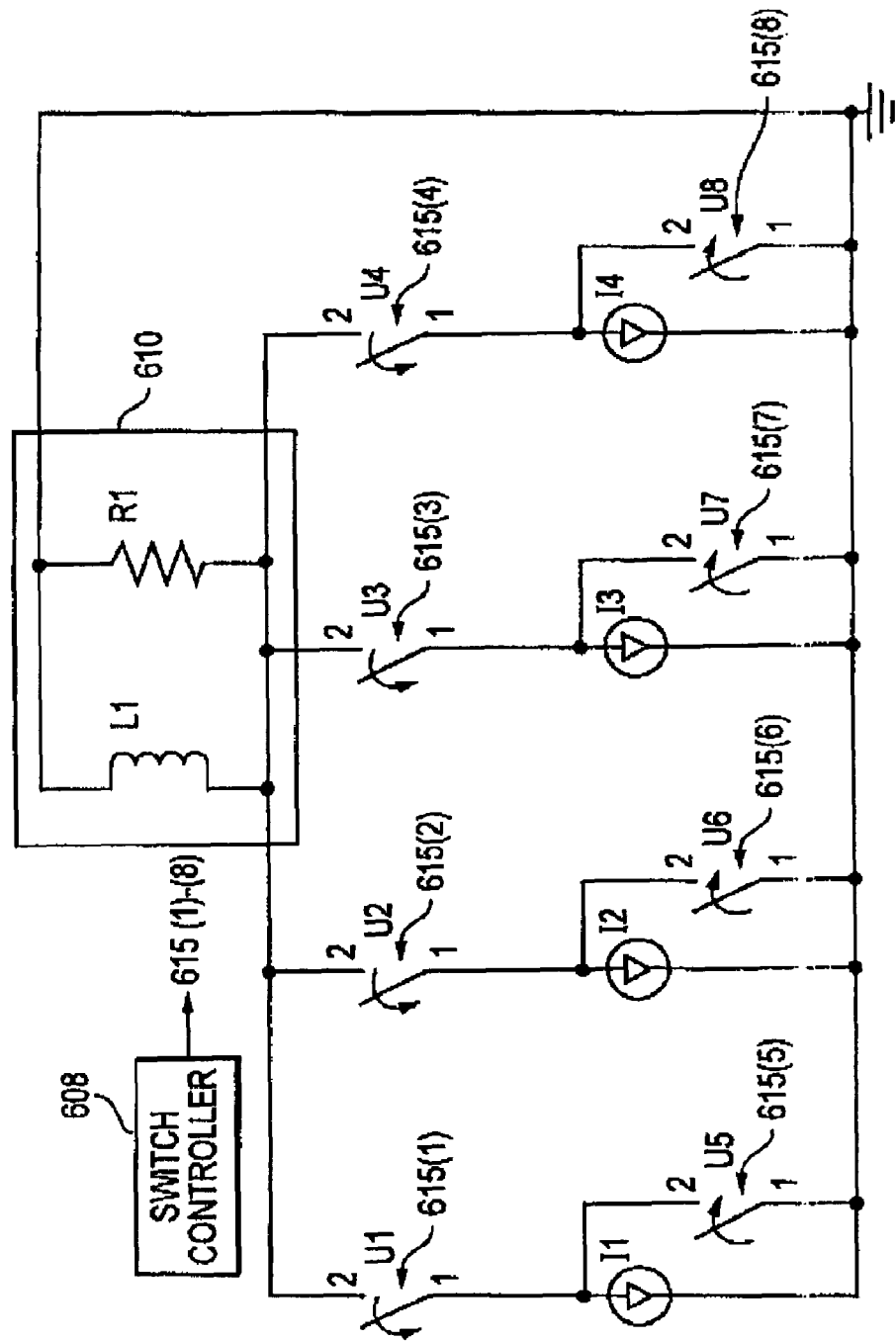
FIGS. 6a–b are block diagrams of the present invention using current sources to excite the transmitter coil.
Figure 6B:
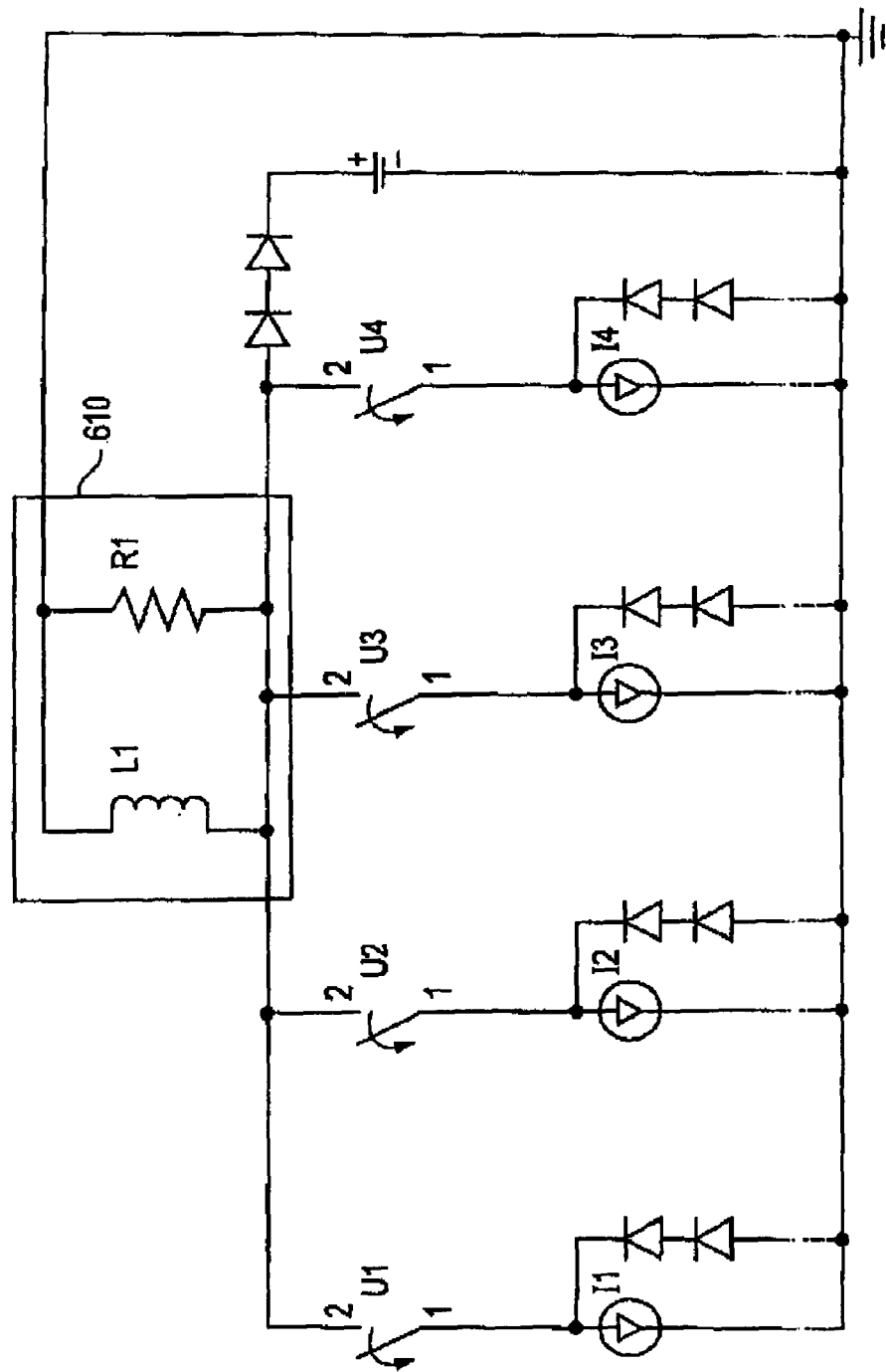

FIGS. 4a–b illustrate the basic concept of the invention using a simple voltage source excitation of the transmitter coil. FIGS. 6a–b are block diagrams of the present invention using current sources to excite the transmitter coil with four excitation pulses.

Referring to FIG. 6a, a switch controller 608 provides switch control signals 615(1)–(8) to respective switches U1–U8. Switches U1–U8 are opened and closed responsive to respective control signals 615(1)–(8) in the sequence to be described below. Initially, switches U1–U4 are closed and switches U5–U8 are open. In this configuration, current sources I1–I4 collectively provide, through closed switches U1–U4, a maximum or peak current to transmitter coil 610 (including inductor L1 and parallel resistor R1) to thereby charge the transmitter coil. The four current sources I1–I4 feed a total of 40 amps current (10 amps each) for instance to the transmitter coil 610. Resistor R1 is a damping resistor that dampens oscillations in the inductor L1 when any of switches U1–U8 opened or closed, as described below.

After the transmitter coil 610 has reached the desired maximum current, switches U1 through U4 are sequentially opened over time to sequentially reduce in steps from maximum to zero the current flowing into transmitter coil 610. For example, switches U1 through U4 are sequentially opened approximately one microsecond apart over approximately 4 microseconds, which is much less than the 15 μs time decay constant of the metal test target described in FIG. 3, for example. Each sequential step down in current caused by opening a switch induces an excitation pulse with a 100 ns turn-off time that excites eddy currents in a metal target. This 100 ns turn-off time is more than an order of magnitude shorter than a typical commercial or military metal detector turn-off time.

In an alternative embodiment, switches U5 through U8 are sequentially closed to sequentially step down the current to transmitter coil 610. When closed, switches U5–U8 short their respective connected current sources I1–I4 to ground.

In yet another embodiment, switches U1 and U5 are concurrently opened and closed, respectively, to produce a first current step down, then switches U2 and U6 are concurrently opened and closed to produce a second current step down, and so on until all of switches U1–U4 are opened and all of switches U8 are closed.

Figure 7:
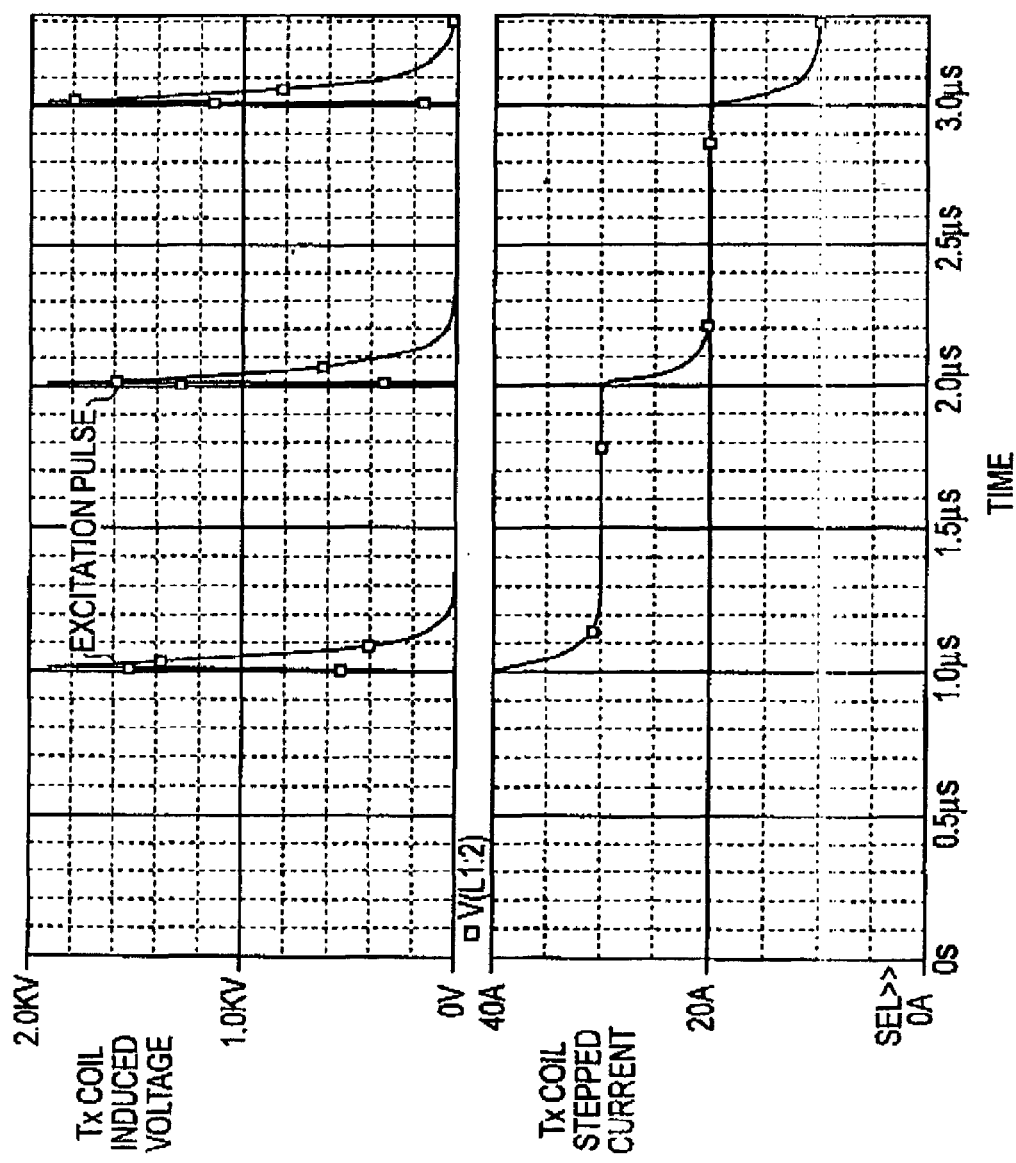
FIG. 7 illustrates simulation results from the circuit in FIG. 4b showing the kick-back voltage across the electronic switches.

FIG. 7 is a graph of the current turn-off sequence described above and the induced voltage in the transmitter coil. These results are from a simulation of the circuit in FIG. 4a using realistic circuit parameters (10 μH transmitter coil inductance) for a high bandwidth and high sensitivity metal detector. As the upper trace shows, 2,000 volts are generated across the transmitter coil for a few tens of nanoseconds. This is close to the maximum voltage rating of current low-cost power transistors and wire insulation rating. To generate the equivalent eddy currents in the metal target with a single power switch transmitter, one would see 4 times the voltage across its terminals; 8,000 volts.

FIG. 6b illustrates a slightly different implementation of the present invention with a limitation of 1500 V clamps on the electronic components. Presently, 1500 V components are more common. This implementation has better performance characteristics but operates essentially the same as above.

The stepped current concept of the present invention allows increased flexibility in designing pulse induction metal detectors. Consider the case of an existing antenna that has been optimized for very high frequency operation (MHz range). Antennas of this configuration typically have a few coil turns and very low inductance. Conventional metal detectors use many turns for increased sensitivity operating at much lower frequencies (KHz range). Using the multiple pulse technique described in this invention, we are able to compensate for the lack of coil turns by using multiple impulses to excite the target. In other words, we can trade-off coil turns for impulses.

Consider also the potential health issues associated with high voltage impulses from a single transmitter turn-off transient. The multiple impulses in this invention use much smaller magnitude voltage impulses in the transmitter and therefore, are likely to have a lower potential health risk.

Another consideration is the potential electromagnetic interference problem. The high voltage from a single transmitter turn-off transient creates a large electric field that may exceed some FCC regulated emissions limit. The multiple impulses in this invention use much smaller voltage impulses in the transmitter and therefore, will likely have lower electric field emissions that are easier to mitigate or fall below regulation standards.

It is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A method of operating a pulsed inductive metal detector transmitter coil to increase sensitivity to a metal target, the method comprising:
   charging the transmitter coil with a current of a pre-determined magnitude; and
   gradually stepping down the magnitude of the current in the transmitter coil over a pre-determined time interval based on predetermined eddy current decay characteristics of the metal target, wherein
   the predetermined eddy current decay characteristics include a time constant that defines a decay time of eddy currents excited in the metal target by an excitation pulse from the transmitter coil, and
   the pre-determined time interval for gradually stepping down the magnitude of the current in the transmitter coil is less than the time constant of the metal target, such that each time the current in the transmitter coil is stepped down eddy currents in the metal target increase.

2. The method of claim 1 wherein the transmitter coil is excited by a voltage source coupled in series with one or more electronically switched resistors such that each time a resistor is switched active to add the resistor in series with the voltage source, the amount of current that excites the transmitter coil is stepped down causing the eddy currents in the metal target to increase.

3. The method of claim 1 wherein the transmitter coil is excited by a voltage source coupled with one or more electronically switched parallel resistors such that each time a resistor is switched active to add the resistor in series with the voltage source, the amount of current that excites the transmitter coil is stepped down causing the eddy currents in the metal target to increase.

4. The method of claim 1 wherein the transmitter coil is excited by a plurality of switched current sources such that each time a current source is switched inactive, the amount of current that excites the transmitter coil is stepped down causing the eddy currents in the metal target to increase.

5. A pulsed inductive metal detector transmitter coil system comprising:
- means for charging a transmitter coil with a current of a pre-determined magnitude; and
- means for gradually stepping down the magnitude of the current in the transmitter coil over a pre-determined time interval based on predetermined eddy current decay characteristics of a metal target, wherein
- the predetermined eddy current decay characteristics of the metal target include a time constant that defines how long it takes the eddy currents in the metal target to decay when excited by a pulse of current resulting from a reduction of current in the transmitter coil, and
- the pre-determined time interval for gradually stepping down the magnitude of the current in the transmitter coil is less than the time constant of the metal target,
- such that each time the current in the transmitter coil is stepped down the eddy currents in the metal target increase.

6. The pulsed inductive metal detector transmitter coil system of claim 5 wherein the means for charging a transmitter coil with a current of a pre-determined magnitude comprises a voltage source coupled in series with one or more electronically switched resistors that excite the transmitter coil with a current such that each time a resistor is switched active to add the resistor in series with the voltage source, the amount of current that excites the transmitter coil is stepped down causing the eddy currents in the metal target to increase.

7. The pulsed inductive metal detector transmitter coil system of claim 5 wherein the means for charging a transmitter coil with a current of a pre-determined magnitude comprises a voltage source coupled with one or more electronically switched parallel resistors that excite the transmitter coil with a current such that each time a resistor is switched active to add the resistor in series with the voltage source, the amount of current that excites the transmitter coil is stepped down causing the eddy currents in the metal target to increase.

8. The pulsed inductive metal detector transmitter coil system of claim 5 wherein the transmitter coil is initially excited by a plurality of switched current sources that, when active, provide current to the transmitter coil, such that each time a current source is switched inactive, the amount of current that excites the transmitter coil is stepped down causing the eddy currents in the metal target to increase.

9. A method of operating a pulsed inductive metal detector transmitter coil to increase sensitivity to a metal target, the method comprising:
- charging the transmitter coil with a current of a predetermined magnitude; and
- gradually stepping down the magnitude of the current in the transmitter coil over a pre-determined time interval that is less than an eddy current decay time constant of eddy currents excited in the metal target by an excitation pulse from the transmitter coil,
- such that each time the current in the transmitter coil is stepped down eddy currents in the metal target build upon one another.

* * * * *